E. GOOLD.
REFLEX CAMERA.
APPLICATION FILED DEC. 24, 1914.
1,177,243.
Patented Mar. 28, 1916.
2 SHEETS—SHEET 2.
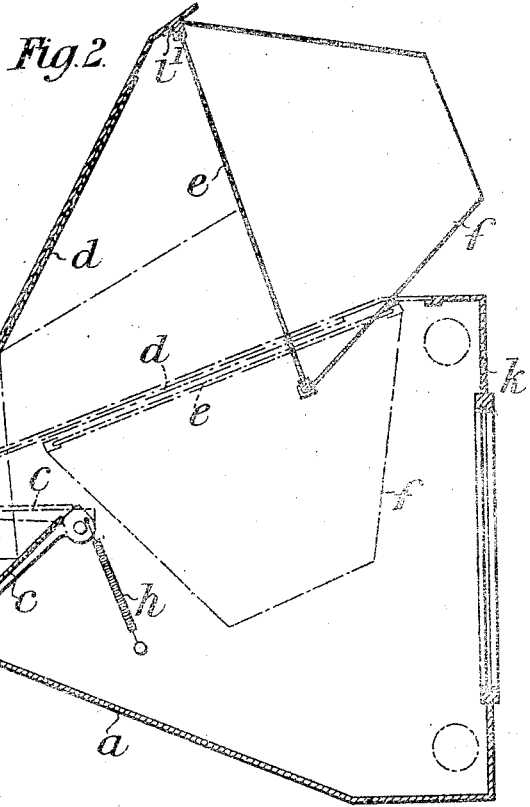
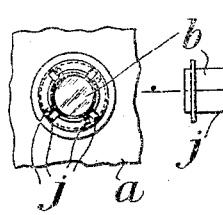
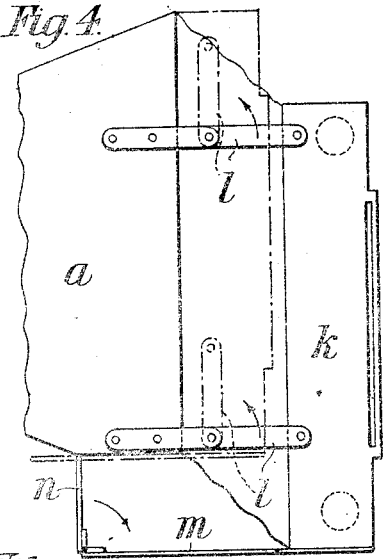
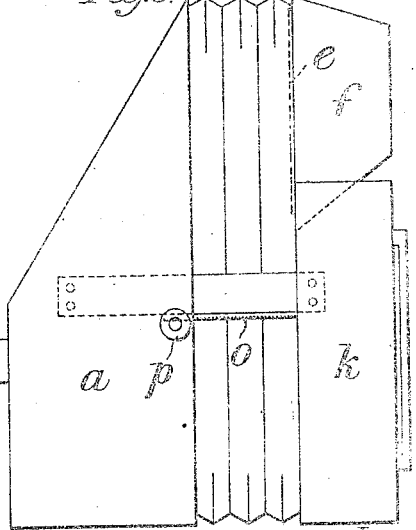

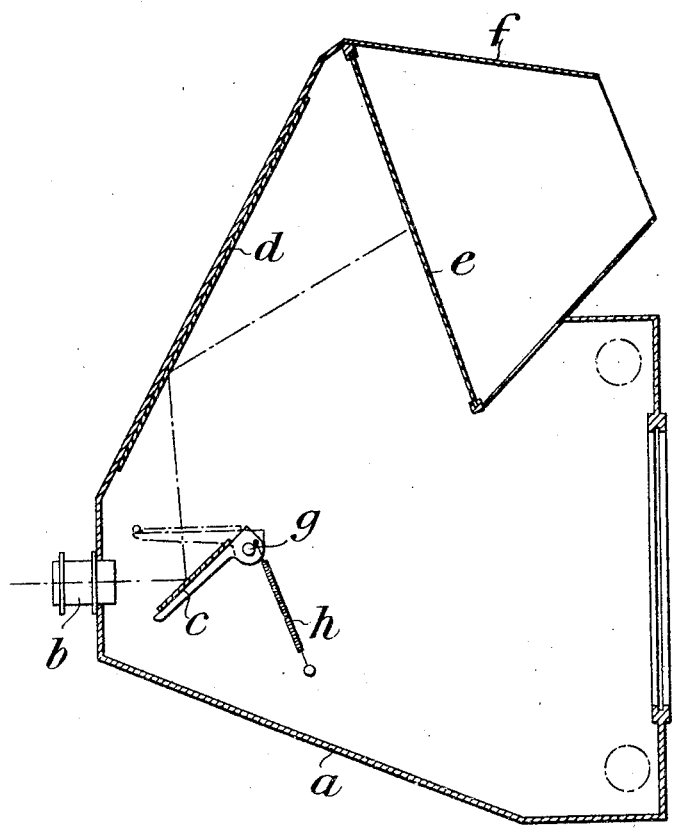

UNITED STATES PATENT OFFICE.

EBENEZER GOOLD, OF GRANTHAM, ENGLAND.

REFLEX CAMERA.

1,177,243.	Specification of Letters Patent.	Patented Mar. 28, 1916.

Application filed December 24, 1914. Serial No. 878,926.

*To all whom it may concern:*

Be it known that I, EBENEZER GOOLD, M. A., a subject of the King of Great Britain, residing at 6 Green Hill, Grantham, Lincolnshire, England, have invented a new and useful Improved Reflex Camera, of which the following is a specification.

My invention relates to reflex cameras of the kind in which two mirrors are used between the lens and focusing screen.

The object of my invention is to so arrange the mirrors that the shutter is separate from and forms no part of them, and so that the camera may be of comparatively small size and easily portable.

My invention will be readily understood by reference to the accompanying drawings, in which:—

Figure 1 is a sectional side elevation of a box form of camera having my improvements applied thereto. Fig. 2 is a view similar to Fig. 1 of a modification. Fig. 3 is a view of a detail hereinafter described. Fig. 4 is a side elevation of a portion of a camera having the body made in two parts, and Fig. 5 is a side elevation of a further modified form of camera provided with focusing means.

Referring first to the construction illustrated in Fig. 1, which, as stated above, illustrates a camera of the box form, $a$ is the body, $b$ the lens and $c$ and $d$ the two mirrors. The mirror $c$ receives the image from the lens $b$ and is located in the front portion of the camera adjacent to the lens and at such an angle that it will divert the image to the second mirror $d$ which is in a plane approximately parallel to that of the mirror $c$, the rays being reflected from the mirror $d$ and directed to the focusing screen $e$ which is in an approximately vertical position. The said screen is protected by a hood $f$ in the usual manner and is arranged in an approximately vertical plane so that the operator views the image which is reflected thereon in an approximately horizontal direction.

The mirror $c$ is pivoted at $g$ so that it can be moved out of the range of the rays from the lens $b$ at the time of exposure, as shown in broken lines in Fig. 1. The said mirror is preferably normally held in the position shown in the broken lines, that is to say, out of the path of the rays from the lens $b$ by a spring such as $h$ and is moved into the position shown in full lines in the figure for the purpose of viewing by any suitable means, which can be released for exposure immediately before the shutter is operated.

In the construction shown in Fig. 1, the mirror $d$ is fixed to the front or lens board of the camera body $a$, and the focusing screen $e$ is also fixed in position relatively to the said body. In the construction illustrated in Figs. 2 and 3, however, the mirror $d'$ is hinged at $i$ to the camera front or lens board and the focusing screen $e'$ is hinged at $i'$ to the frame carrying the said mirror $d'$. With this construction the said focusing screen can be folded against the mirror $d'$ and the latter turned downward into the position shown in broken lines when the camera is not required for use.

In the form of my invention illustrated in Fig. 1, the lens $b$ is fixed to the front board of the body $a$ but the said lens may be so connected to the said front board that it may be released and pushed within the camera when not required for use. Such a construction is illustrated in Figs. 2 and 3 in which the lens is fitted with a bayonet fastening $j$ so that when not required for use it may be turned and pushed within the body $a'$ and beneath the mirror $c'$ when the latter is raised as shown in broken lines in Fig. 2.

The two constructions of camera referred to in the foregoing description have the back portion comprising the shutter and plate holder $k$ forming an integral portion of the body $a$. This back portion, however, may be made separate from the front portion, which holds the lens, mirrors, and screen, and such a construction is illustrated in Fig. 4, in which the said back part $k'$ is attached by means of links $l$ to the rear of the body $a'$, so that the said back part can open to a suitable length for infinity focus as shown in full lines, and be closed or folded up as shown in broken lines, when not required for use. In this form of the invention the back part $k'$ is shown provided with a base board $m$, this base board being designed to hold a bush for a screw to fasten on a stand or revolving center or turn-table of the usual type. The base board is furnished with hinged struts $n$ for retaining it in place when the track $k'$ is extended.

When the lens $b$ is not provided with a focusing mount and it is desired that focusing may be effected with the camera, the screen $e^2$ may be attached to the back part $k^2$ holding the shutter and plate holder so as to be movable with the said back part.

Such a construction is illustrated in Fig. 5 in which the movement of the back part relatively to the body for focusing purposes is effected by means of the rack $o$ and pinion $p$.

It will be understood that any ordinary suitable means may be made use of for rendering the inside of the camera light-tight when the mirror $c$ is up for exposure, and also to effectually shut out light between hinged or moving parts.

Claims.

1. In a reflex camera of the kind referred to, the combination of a mirror adjacent to the lens, means for moving said mirror out of the path of the rays passing through the lens, a second mirror receiving the rays from the first mirror and a viewing screen for receiving the rays from the second mirror.

2. In a reflex camera of the kind referred to, the combination of a mirror adjacent to the lens and pivoted so that it can be moved out of the path of the rays passing through the latter, and a second mirror receiving the rays from the first mirror and a viewing screen for receiving the rays from the latter, substantially as hereinbefore described.

3. In a reflex camera of the kind referred to, the combination of a mirror adjacent to the lens, means for moving said mirror out of the path of the rays passing through the lens, a second mirror fixed to the camera front or lens board and a viewing screen for receiving the rays from the second mirror.

4. A reflex camera comprising a casing formed of a front and rear part movably connected together, said front part being provided with a lens, a mirror adjacent to the lens and receiving the rays therefrom, means for moving said mirror out of the path of the rays passing through said lens, a second mirror receiving the rays from the first mirror, and a viewing screen for receiving the rays from the said mirror, and the rear part of said casing being adapted to carry the shutter and plate holder.

5. A reflex camera comprising a casing formed of a front and rear part pivotally connected together, said front part being provided with a lens, a mirror adjacent to the lens and receiving the rays therefrom, means for moving said mirror out of the path of the rays passing through said lens, a second mirror receiving the rays from the first mirror, and a viewing screen for receiving the rays from the said mirror, and the rear part of said casing being adapted to carry the shutter and plate holder.

EBENEZER GOOLD.

Witnesses:
 DAVID ROBERTS,
 W. HAYNE.